United States Patent
Naito et al.

[11] Patent Number: 5,746,487
[45] Date of Patent: May 5, 1998

[54] ANTI-SKID CONTROL SYSTEM FOR AUTOMOTIVE VEHICLE

[75] Inventors: Takeshi Naito, Anjo; Akitaka Nishio, Okazaki, both of Japan

[73] Assignee: Aisin Seiki Kabushiki Kaisha, Kariya, Japan

[21] Appl. No.: 560,487

[22] Filed: Nov. 17, 1995

[30] Foreign Application Priority Data

Nov. 18, 1994 [JP] Japan .................... 6-285086

[51] Int. Cl.$^6$ .................................... G06F 7/70
[52] U.S. Cl. ............ 303/158; 303/146.1; 364/426.015
[58] Field of Search .................... 303/116.1, 155, 303/156, 157, 158, 174; 364/426.01, 426.02, 426.015, 426.017, 426.019

[56] References Cited

U.S. PATENT DOCUMENTS

| | | | |
|---|---|---|---|
| 4,209,203 | 6/1980 | Brearley | 303/174 X |
| 4,912,641 | 3/1990 | Kuwana et al. | 364/426.02 |
| 4,921,314 | 5/1990 | Braschel et al. | |
| 4,985,839 | 1/1991 | Dominke | |
| 5,265,947 | 11/1993 | Wupper et al. | 303/156 |
| 5,295,738 | 3/1994 | Matsuura et al. | 303/158 |

FOREIGN PATENT DOCUMENTS

| | | |
|---|---|---|
| 42 13 710 | 10/1993 | Germany . |
| 44 12 650 | 10/1995 | Germany . |
| 195 42 014 | 5/1996 | Germany . |
| 2 294 989 | 5/1996 | United Kingdom . |
| 90/08681 | 8/1990 | WIPO . |

*Primary Examiner*—Robert J. Oberleitner
*Assistant Examiner*—Pamela J. Lipka
*Attorney, Agent, or Firm*—Burns, Doane, Swecker & Mathis, LLP

[57] ABSTRACT

An anti-skid control system for an automotive vehicle includes a hydraulic pressure source, a wheel brake for braking a wheel, a pressure control valve interposed between the hydraulic pressure source to the wheel brake in order to regulate a hydraulic braking pressure supplied from the hydraulic pressure source and the wheel brake, the pressure control valve being brought into a duty-cycle pressure-increasing mode operation and a pressure-decreasing mode operation for increasing and decreasing the hydraulic braking pressure, respectively. The duty-cycle pressure-increasing mode operation are repeated such that the pressure-decreasing mode operation is established therebetween. A later pressure-increasing mode operation is treated as a succession of the previous pressure-increasing mode operation if a time duration required for the pressure-decreasing mode operation between the previous and later pressure-increasing mode operations is less than a set value.

6 Claims, 5 Drawing Sheets

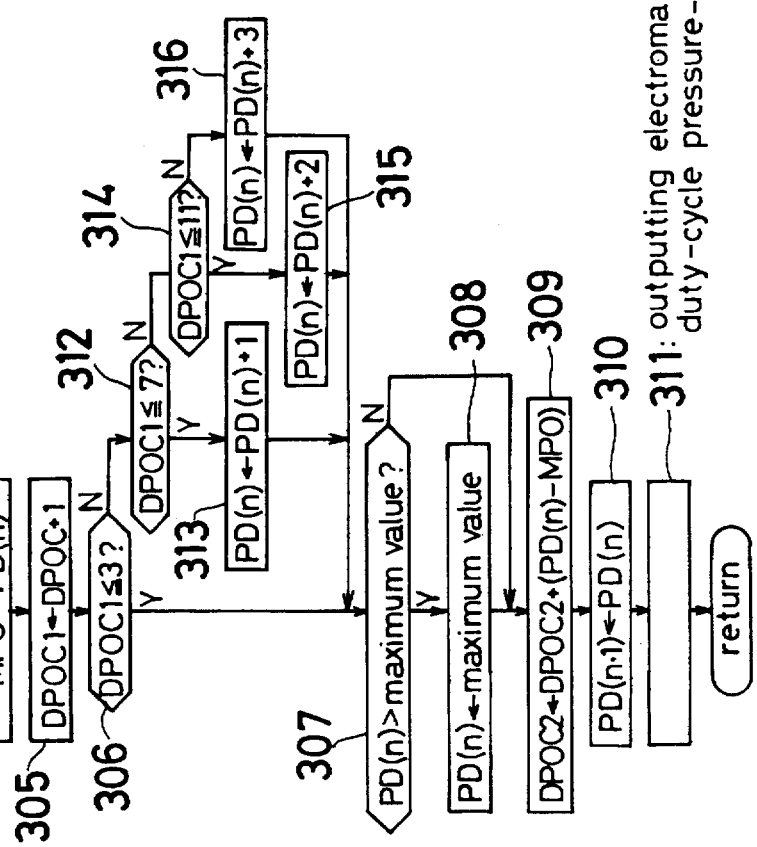

ANTI-SKID CONTROL SYSTEM FOR AUTOMOTIVE VEHICLE

FIELD OF THE INVENTION

The present invention relates to an anti-skid control system for an automotive vehicle, and more particularly to a vehicle anti-skid control system which is operable in a pressure decreasing mode operation or a duty-cycle pressure-increasing mode operation based on the wheel speed detected by a wheel speed sensor.

BACKGROUND OF THE INVENTION

A conventional anti-skid control system is disclosed in U.S. Pat. No. 4,912,641. In this conventional anti-skid control system, when a controller determines that the hydraulic braking pressure in the wheel brake should be increased gradually, duty-cycle pressure-increasing mode operations are repeated in such a manner that a pressure-decreasing mode operation is established between two adjacent duty-cycle pressure-increasing mode operations. In each of the duty-cycle pressure-increasing mode operations, a plurality of intermittent pressure increases per unit time duration occur. Between two adjacent pressure increases, a pressure decrease to a specific value occurs. The ratio of time duration for the intermittent pressure increase to the unit time duration is defined as a duty cycle and the duty cycles in each of the duty-cycle pressure-increasing mode operations becomes larger in turn. In a later duty-cycle pressure-increasing mode operation, the first duty cycle is set on the basis of a repetition number which indicates how many times the intermittent pressure increases are established in the previous duty-cycle pressure-increasing mode operation. More specifically, in a situation where the repetition number is larger (smaller) than a reference value in the previous duty-cycle pressure-increasing mode operation, the pressure increasing graduation is found to be small (large) which means that the pressure increasing graduation is gentle (sharp). If the pressure increasing graduation is gentle (sharp), in the next duty-cycle pressure-increasing mode operation, for sharpening (easing) the pressure increasing graduation, the initial value of the first duty cycle is set to be larger (smaller). Thus, the pressure increasing graduation is, as a whole, corrected or adjusted to a suitable value.

However, in the foregoing anti-skid operation in which the hydraulic braking pressure is alternately-increased and decreased, as a whole, a hydraulic pressure vibration occurs during establishment of the gradual increase of the hydraulic braking pressure. Such a hydraulic pressure vibration may bring about an unexpected pressure-decreasing mode operation, and so the initial value of the duty cycle when the next duty-cycle pressure-increasing mode operation is found to be required becomes smaller than the desired value. Thus, the pressure increasing gradient also becomes smaller, resulting in a later increase of the hydraulic braking pressure.

SUMMARY OF THE INVENTION

It would be desirable, therefore, to provide an anti-skid control system for an automotive vehicle without the foregoing drawback.

To address this need, the present invention provides an anti-skid control system for an automotive vehicle that includes a hydraulic pressure source, a wheel brake connected to the pressure source for braking a wheel, and a pressure control valve interposed between the hydraulic pressure source and the wheel brake to regulate hydraulic braking pressure supplied from the hydraulic pressure source to the wheel brake. The pressure control valve is operable in a duty-cycle pressure-increasing mode operation and a pressure-decreasing mode for increasing and decreasing the hydraulic braking pressure, respectively. A speed sensor is provided for detecting the speed of the wheel, and an electric control device controls the pressure control valve on the basis of signals from the speed sensor to alternately establish the duty-cycle pressure-increasing mode operation and the pressure-decreasing mode operation to effect a gradual increasing of the hydraulic braking pressure. The electric control device is operated such that a later duty-cycle pressure-increasing mode operation is treated as a succession of the previous duty-cycle pressure-increasing mode operation if the time duration between the previous and later duty-cycle pressure-increasing mode operations is less than a set value.

BRIEF DESCRIPTION OF THE DRAWING FIGURES

The above and other features and advantages of the present invention will be more apparent and more readily appreciated from the following detailed description of a preferred exemplary embodiment of the present invention, considered in connection with the accompanying drawing figures, in which like elements are designated by like elements and wherein:

FIG. 5 is a flowchart showing a subroutine for outputting valve control signals to the electromagnetic valves when a duty-cycle pressure-increasing mode operation has been established.

DETAILED DESCRIPTION OF THE PREFERRED EMBODIMENT

Figure 1:
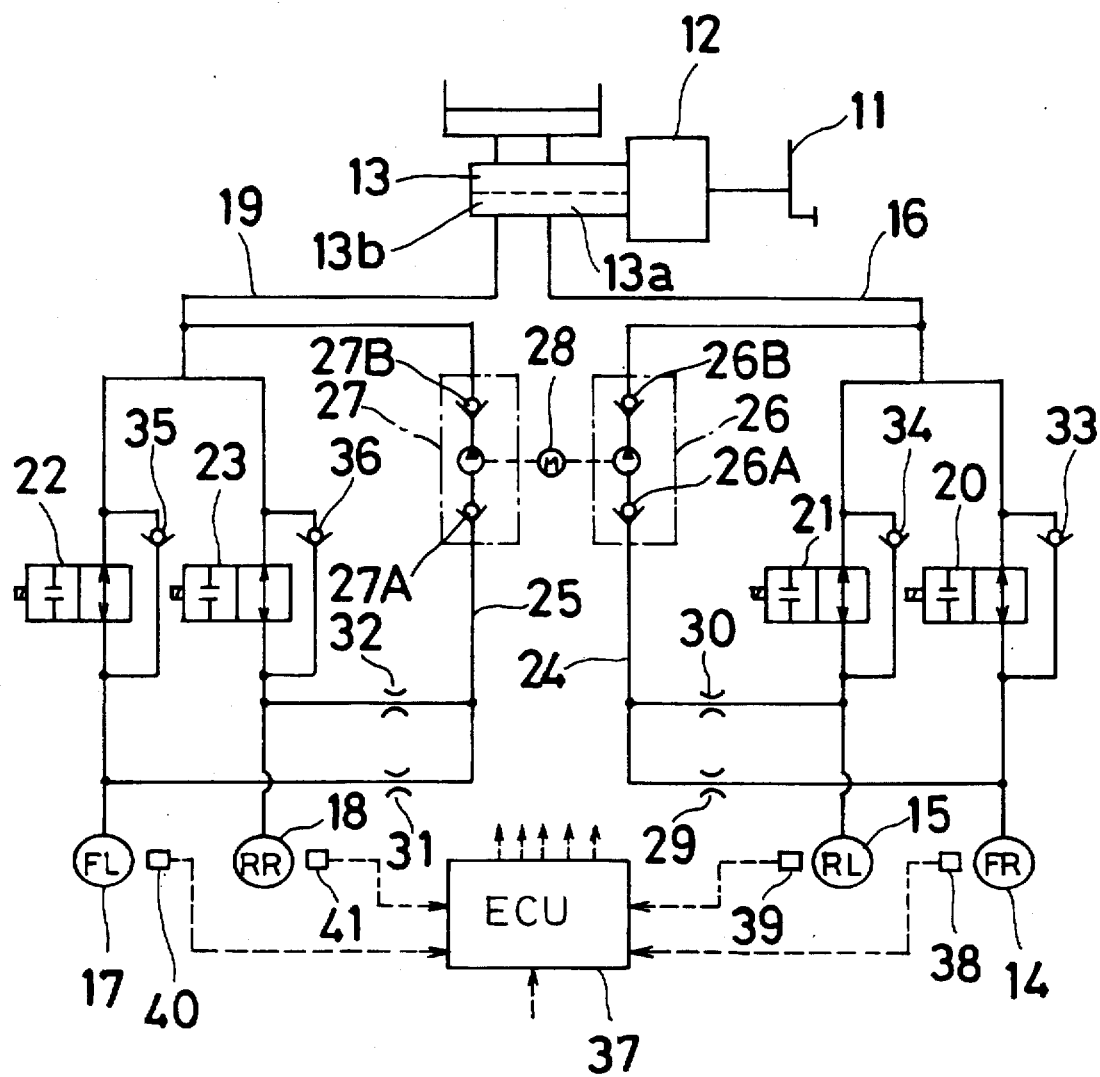
FIG. 1 is a circuit diagram of an embodiment of an anti-skid control system for an automotive vehicle in accordance with the present invention.

FIG. 1 illustrates a fluid circuit diagram of an anti-skid control device for an automotive vehicle in accordance with an embodiment of the present invention. The brake control device includes a tandem type master cylinder 13 in which is provided a first fluid pressure chamber 13a and a second fluid pressure chamber 13b. The master cylinder 13 is connected to a brake pedal 11 via a vacuum type brake power booster 12. When the brake pedal 11 is depressed, the resultant force transmitted to the vacuum type brake power booster 12 is boosted and the boosted force is then transmitted to the tandem type master cylinder 13, thereby generating fluid pressures as hydraulic braking pressures in the first fluid pressure chamber 13a and the second fluid pressure chamber 13b. A front-right wheel brake 14 and a rear-left wheel brake 15 are in fluid communication with the first fluid pressure chamber 13a via a first main fluid passage 16. A front-left wheel brake 17 and a rear-right wheel brake 18 are in fluid communication with the second fluid pressure chamber 13b via a second main fluid passage 19.

A first electromagnetic valve 20 and a second electromagnetic valve 21 which are in a parallel arrangement with one another are disposed in the first main fluid passage 16. The first electromagnetic valve 20 is a normally open type valve which functions to isolate only the front-right wheel brake 14 from the first pressure chamber 13a when actuated. The second electromagnetic valve 21 is also a normally open type valve that functions to isolate only the rear-left wheel brake 15 from the first pressure chamber 13a when actuated. Similarly, disposed in the second main fluid passage 19 are a third electromagnetic valve 22 and a fourth electromagnetic valve 23 which are in a parallel arrangement with one another. The third electromagnetic valve 22 is in the form of a normally open type valve which serves to isolate only the front-left wheel brake 17 from the second pressure chamber 13b when actuated. The fourth electromagnetic valve 23 is also in the form of a normally open type valve which functions to isolate only the rear-left wheel brake 18 from the second pressure chamber 13b when actuated.

The first main fluid passage 16 is provided with a first return passage 24 for returning brake fluid in the front-right wheel brake 14 and the rear-left wheel brake 15 to respective upstream sides of the first electromagnetic valve 20 and the second electromagnetic valve 21 without passing through such valves 20, 21. Similarly, the second main fluid passage 19 is provided with a second return passage 25 for returning brake fluid in the front-left wheel brake 17 and the right-rear wheel brake 18 to respective upstream sides of the third electromagnetic valve 22 and the fourth electromagnetic valve 23 without passing through such valves 22, 23.

A first fluid pressure pump 26 is provided in the first return passage 24 for feeding brake fluid under pressure from the front-right wheel brake 14 and the rear-left wheel brake 15 to a side of the first fluid pressure chamber 13a of the master cylinder 13. The first fluid pressure pump 26 includes a sucking valve 26A and a discharging value 26B. Similarly, a second fluid pressure pump 27 is provided in the second return passage 25 for feeding brake fluid under pressure from the front-left wheel brake 17 and the rear-right wheel brake 18 to a side of the second fluid pressure chamber 13b of the master cylinder 13. The second fluid pressure pump 27 includes a sucking valve 27A and a discharging valve 27B. Both of the fluid pressure pumps 26 and 27 are driven by a common electric motor 28.

A first orifice 29 is disposed between the front-right wheel brake 14 and the sucking valve 26A of the first fluid pressure pump 26. The first orifice 29 serves for decreasing and increasing the brake fluid pressure in the front-right wheel brake 14 when the first electromagnetic valve 20 is closed and opened, respectively, while the first fluid pressure pump 26 is being driven and the master cylinder 13 is under operation. In addition, a second orifice 30 is disposed between the rear-left wheel brake 15 and the sucking valve 26A of the first fluid pressure pump 26. The second orifice 30 serves for decreasing and increasing the brake fluid pressure in the rear-left wheel brake 15 when the second electromagnetic valve 21 is closed and opened, respectively, while the first fluid pressure pump 26 is being driven and the master cylinder 13 is under operation.

A third orifice 31 is disposed between the front-left wheel brake 17 and the sucking valve 27A of the second fluid pressure pump 27. The third orifice 31 serves for decreasing and increasing the brake fluid pressure in the front-left wheel brake 17 when the third electromagnetic valve 22 is closed and opened, respectively, while the second fluid pressure pump 27 is being driven and the master cylinder 13 is under operation. In addition, a fourth orifice 32 is disposed between the rear-right wheel brake 18 and the sucking valve 27A of the second fluid pressure pump 27. The fourth orifice 32 serves for decreasing and increasing the brake fluid pressure in the rear-right wheel brake 18 when the fourth electromagnetic valve 23 is closed and opened, respectively, while the second fluid pressure pump 27 is being driven and the master cylinder 13 is under operation.

A first one-way valve 33 (a second one-way valve 34) is provided in the first main passage 16 across the first electromagnetic valve 20 (the second electromagnetic valve 21) for decreasing the brake fluid pressure in the front-right wheel brake 14 (rear-left wheel brake 15) to equalize such pressure with respect to the fluid pressure in the fluid pressure chamber 13a when the fluid pressure in the fluid pressure chamber 13a becomes less than the brake fluid pressure in the front-right wheel brake 14 (rear-left wheel brake 15) due to a releasing of the master cylinder 13, for example. Similarly, in the third main passage 19, a second one-way valve 35 (a fourth one-way valve 36) is provided across the third electromagnetic valve 22 (the fourth electromagnetic valve 23) for decreasing the brake fluid pressure in the front-left wheel brake 17 (rear-right wheel brake 18) to equalize such pressure to the fluid pressure in the second pressure chamber 13b when the fluid pressure in the fluid pressure chamber 13b becomes less than the brake fluid pressure in the front-left wheel brake 17 (rear-right wheel brake 18) due to a releasing of the master cylinder 13, for example.

In FIG. 1, when the brake pedal 11 is depressed, the master cylinder 13 is activated and brake fluid pressure is generated in the first fluid pressure chamber 13a and the second fluid pressure chamber 13b. The resultant brake fluid pressure in the first fluid pressure chamber 13a is supplied to the front-rear wheel brake 14 via the first main passage 16 and the first electromagnetic valve 20, and is also supplied to the rear-left wheel brake 15 via the first main passage 16 and the second electromagnetic valve 21. Concurrently, the resultant brake fluid pressure in the second fluid pressure chamber 13b is supplied to the front-left wheel brake 17 via the second main passage 19 and the third electromagnetic valve 22, and is also supplied to the rear-right wheel brake 18 via the second main passage 19 and the fourth electromagnetic valve 23. Thus, the front-right wheel (not shown), the rear-left wheel (not shown), the front-left wheel (not shown) and the rear-right wheel (not shown) are supplied with braking forces depending on the respective brake fluid pressures in the wheel brakes 14, 15, 17 and 18. This results in the vehicle being brought into a braking condition.

While the vehicle is in the braking condition, subject to the rotation of each of the pumps 26 and 27 by the common motor 28, the brake fluid pressure in the front-right wheel brake 14 (the rear-left wheel brake 15/the front-left brake wheel 17/the rear-right wheel brake 18) can be decreased and increased by activating and deactivating, respectively, the first electromagnetic valve 20 (the second electromagnetic valve 21/the third electromagnetic valve 22/the fourth electromagnetic valve 23).

When the first pump 26 is brought into rotation or operation, the brake fluid in the front-right wheel brake 14 (the rear-left wheel brake 15) is sucked into the first pump 26 via the first orifice 29 (the second orifice 30) and is discharged into the upstream side of the first electromagnetic valve 20 (the second electromagnetic valve 21). The resultant brake fluid flows into the front-right wheel brake 14 (the rear-left wheel brake 15) again via the first electromagnetic valve 20 (the second electromagnetic valve 21). The size or rating of the first orifice 29 (the second orifice 30) is designed so that the quantity of brake fluid sucked into the first pump 26 is less than that flowing into the front-right wheel brake 14 (the rear-left wheel brake 15), so that during operation of the first fluid pump 26 the activation or closing of the first electromagnetic valve 20 (the second electromagnetic valve 21) results in a brake fluid pressure-decrease in the front-right wheel brake 14 (the rear-left wheel brake 15). While the first pump 26 is being driven, deactivation or opening of the first electromagnetic valve 20 (the second electromagnetic valve 21) causes an increase in the brake fluid pressure in the front-right wheel brake 14 (the rear-left wheel brake 15). Moreover, controlling the first electromagnetic valve 20 (the second electromagnetic valve 21) in a duty-cycle manner enables a gradual pressure-increase of the brake fluid in the front-right wheel brake 14 (the rear-left wheel brake 15).

In a manner similar to that described above with reference to the front-right wheel brake 14 (the rear-left wheel brake 15), the brake fluid pressure in the front-left wheel brake 17 (the rear-right wheel brake 18) can be increased, decreased and gradually increased.

The electromagnetic valves 20–23 and the motor 28 are connected to and are under the control of an electronic control device ECU. The control device ECU receives wheel speed signals from a first speed sensor 38 provided on the front-right wheel that is braked by the front-right wheel brake 14, a second speed sensor 39 provided on the rear-left wheel that is braked by the rear-left wheel brake 15, a third speed sensor 40 provided on the front-left wheel that is braked by the front-left wheel brake 17, and a fourth speed sensor 41 which is provided on the rear-right wheel to be braked by the rear-right wheel 18, respectively.

Figure 2:
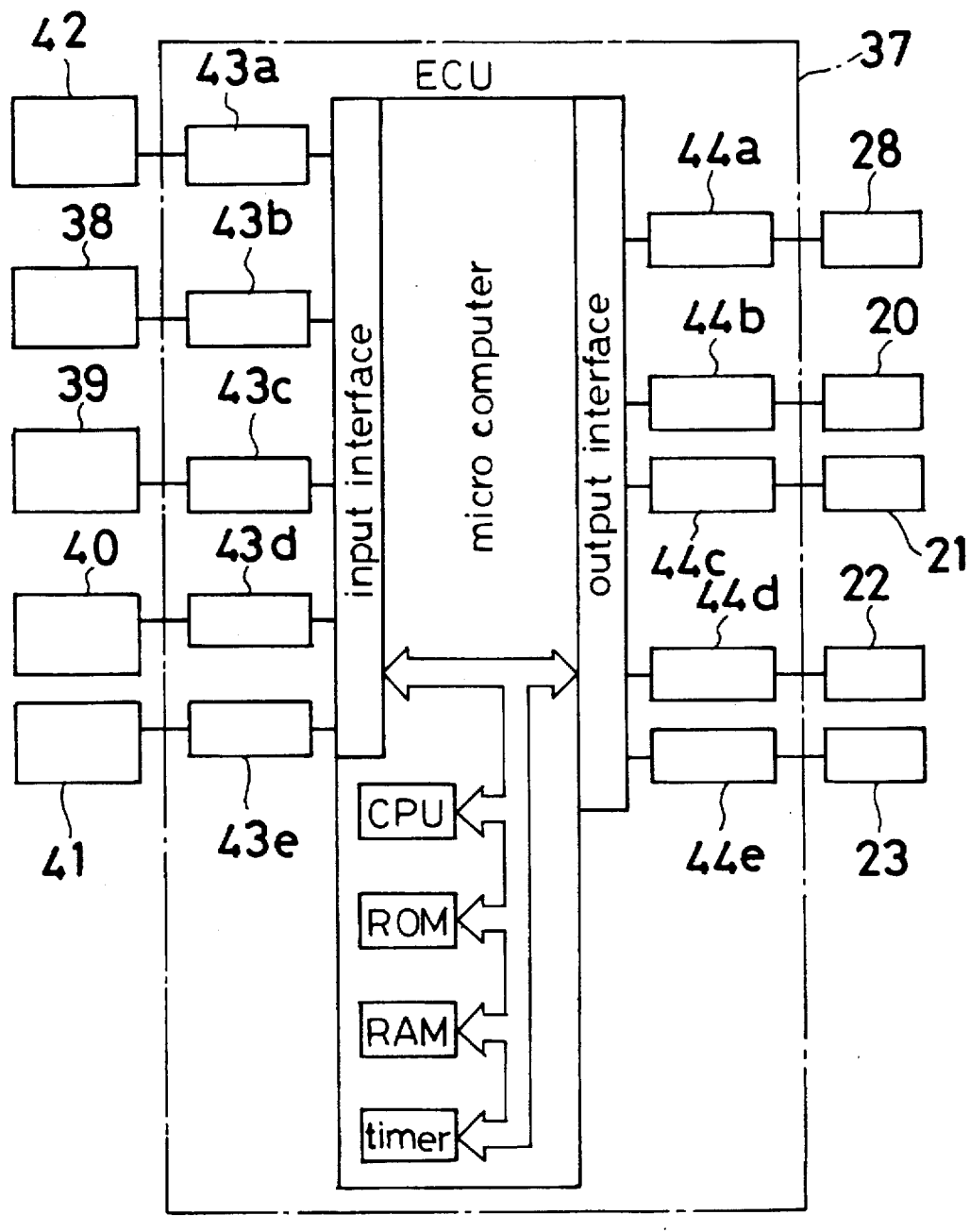
FIG. 2 is a circuit diagram of an electric control device of the system shown in FIG. 1.

As can be seen from FIG. 2, the electronic control device ECU has a microprocessor including a CPU, a ROM, a RAM, a timer, an input interface and an output interface which are mutually connected via a bus. An output signal of a stop switch 42 which is turned on when the brake pedal 11 is depressed is fed to the CPU via an amplify circuit 43a and the input interface. An output signal of the wheel speed sensor 38 (39/40/41) is fed to the CPU via an amplify circuit 43b (43c/43d/43e) and the input interface. From the output interface, a control signal is transmitted via a driving circuit 44a to the electric motor 28. The output interface also issues driving signals to the electromagnetic valves 20, 21, 22 and 23 via driving circuits 44b, 44c, 44d and 44e, respectively. In the micro-processor, the ROM stores a program corresponding to the flowchart shown in FIG. 3 and the program is to be executed while an ignition key switch (not shown) is being closed or turned on. The RAM temporarily stores one or more variables which are required for the execution of the program.

Figure 3:
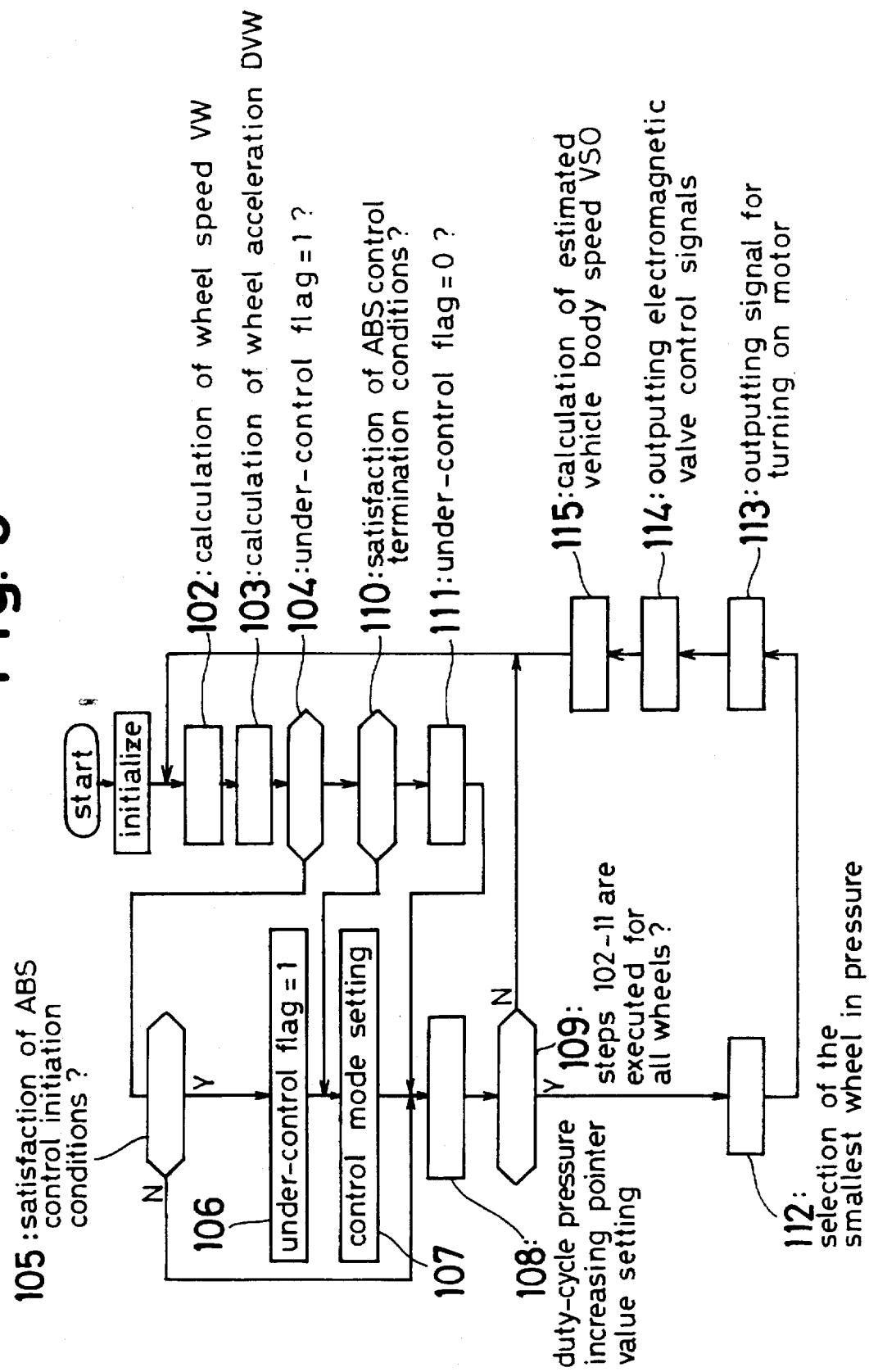
FIG. 3 is a flowchart showing a main routine of a program for controlling the electric control device shown in FIG. 2.

In the above-described device, as soon as the ignition key switch is closed, an execution of the program corresponding to the flowchart shown in FIG. 3 is initiated. In step 101, the micro-processor is initialized and various operation values, an estimated vehicle body speed VSO which represents the vehicle's speed, a wheel speed VW of each of the wheels, a wheel acceleration DVW of each of the wheels, and other items are cleared. In step 102, on the basis of the output signals from the wheel speed sensors 38–41, the wheel speed VW of each of the wheels is calculated and in step 103 using the results in step 102 the wheel acceleration DVW of each of the wheels is calculated.

In step 104, it is checked whether or not an under-control flag is "1" for recognizing whether or not the vehicle is under ABS control. If the result in step 104 is no, the control goes to step 105 for checking whether or not the ABS control initiation conditions are satisfied on the basis of the output signal from the stop switch 42, the wheel speed VW of each of the wheels, the wheel acceleration DVW of each of the wheels and the estimated vehicle body speed VSO. If the result in step 105 is no, the control proceeds to step 108. If the result in step 105 is yes, i.e., the ABS control initiation conditions are satisfied, step 106 is executed for setting the under-control flag to "1". The program then proceeds to step 107 where, on the basis of the wheel speed VW of each of the wheels, the wheel acceleration DVW of each of the wheels and the estimated vehicle body speed VSO, the control mode of each wheel is set to either a pressure-decreasing mode, a duty-cycle pressure-increasing mode (gradual pressure-increasing mode) or a pressure-increasing mode. Then, the control goes to step 108.

On the other hand, if the result in step 104 reveals that the vehicle is under the ABS control (i.e., the result is yes), step 110 is executed for checking whether the control termination conditions are satisfied. If the result is no, the control goes to step 107 and the control mode setting is performed as mentioned above. On the contrary, if the result in step 110 is yes, indicating that the control termination conditions have been established, step 111 is executed for resetting the under-control flag to "0". Then, the control proceeds to step 108.

In step 108, a duty-cycle pressure-increasing pointer value which corresponds to the duty cycle as defined in the background discussion above is set as will be detailed later and then the control goes to step 109. Steps 102–111 are executed for all four wheels and if such executions for all four wheels are confirmed in step 109 the control proceeds to step 112. In step 112, either the rear-right wheel brake 18 or the rear-left wheel brake 15, whichever has the smaller pressure, is selected as a control object. Then, electromagnetic valve control signals are outputted in step 114, and the estimated vehicle body speed VSO is calculated in step 115. Thereafter, the control returns to step 102.

In step 112, the set control mode in step 107 is checked for each of the rear-right wheel and the rear-left wheel, and when at least one wheel is set to be in the pressure-decreasing mode the other wheel is deemed to be in the pressure-decreasing mode, and when no wheel is set to the pressure-decreasing mode and at least one wheel is set to the duty-cycle pressure-increasing mode all wheels are deemed to be in the duty-cycle pressure-increasing mode. In step 113, if any one of the under-control flags of the four wheels is found to be "1", the motor 28 is turned on and if all of the under-control flags of the four wheels are found to be "0" the motor 28 is turned off.

In step 114, the electromagnetic valve 20 (22) is fed a control signal corresponding to the set control mode of the front-right wheel (front-left wheel) in step 107 which is selected as a control object wheel. The set control mode can be one of three types, namely, a pressure-decreasing mode, a pressure-increasing mode and a duty-cycle pressure-increasing mode. If the control mode is the pressure-decreasing mode, the control signal is designed to establish a continual current application to the electromagnetic valve 20 (22) for closing the valve 20 (22). In the case of the pressure-increasing mode, the control signal that is delivered prevents the application of continual current to the electromagnetic valve 20 (22) for maintaining the valve 20 (22) in the open and unchanged position. Whenever the duty-cycle pressure-increasing mode is set, the control signal is designed to establish an intermittent current application to the electromagnetic valve 20 (22) for repeatedly closing and opening the valve 20 (22). The electromagnetic valves 21 and 23 are fed with a common control signal corresponding to the set control mode of the selected wheel in step 112.

Figure 4:
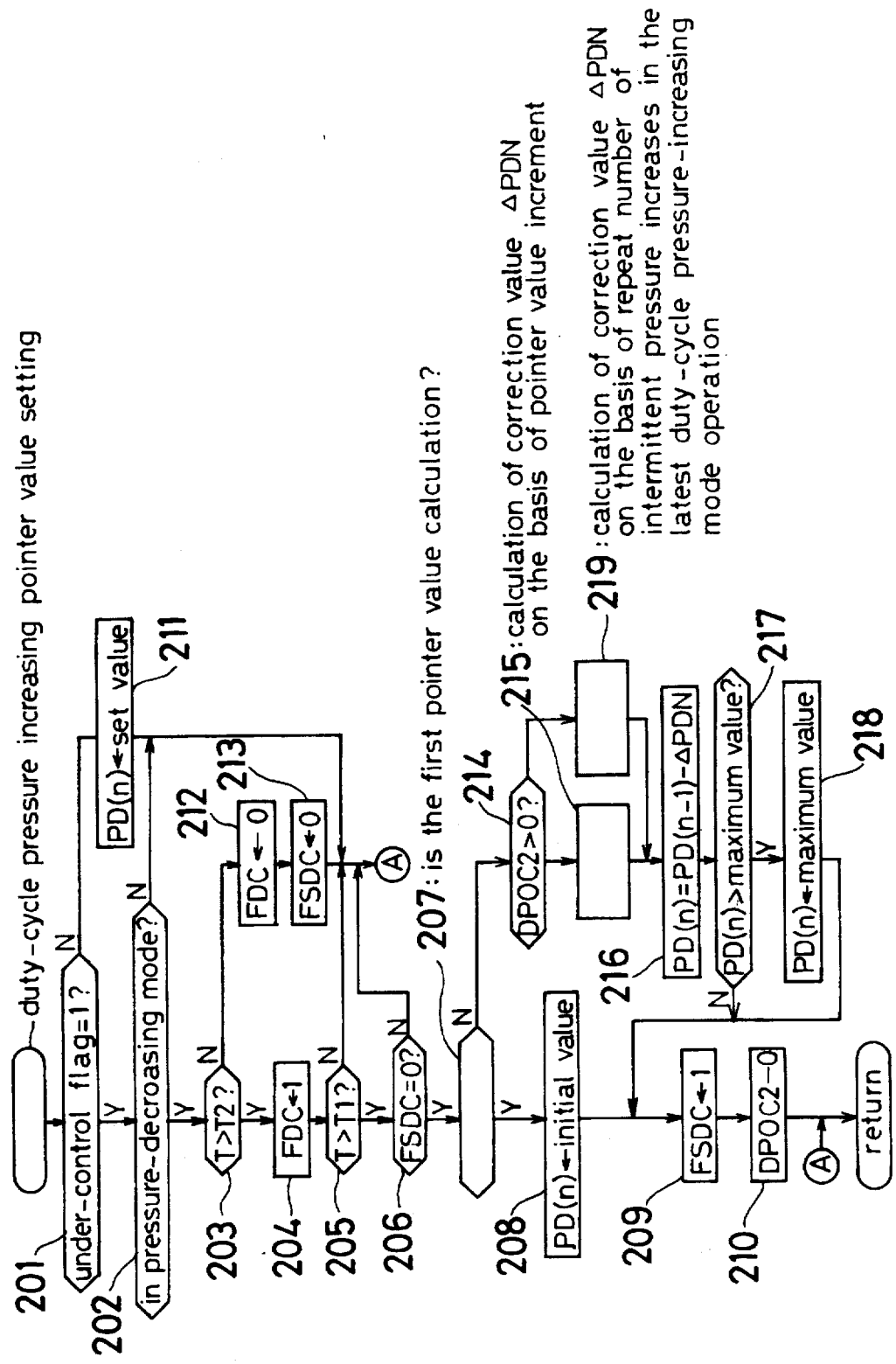
FIG. 4 is a flowchart showing a subroutine for setting the duty-cycle pressure increase pointer value (setting duty ratio)

FIG. 4 is a subroutine illustrating the operation details relating to step 108 in FIG. 3. In FIG. 4, PD(n) represents the pointer value for setting the duty ratio, FDC represents the repetition counter clear flag (duty cycle pressure increase counter clear flag), ΔPDN represents the correction value for the pointer value PD(n), DPOC1 represents a repetition counter for counting the number of duty cycle pressure increase operations, DPOC2 represents a counter, FSDC represents a pointer value setting finish clear flag, T identifies the time during the pressure decrease mode, T1 is a predetermined set value and T2 is a predetermined set value shorter than T1.

Referring to FIG. 4, in step 201 the under-control flag is checked to determine whether or not it is "1". If the result is no, the control goes to step 211 for updating the duty-cycle pressure-increasing pointer value PD(n) to a predetermined value and returns to the main routine shown in FIG. 3. If the under-control flag is found to be "1" in step 201, the control goes to step 202 for checking whether or not the object wheel brake 15/18 is in the pressure-decreasing mode. If the result is no, the control goes to the main routine shown in FIG. 3. If the result in step 202 is yes, step 203 is executed for comparing the time duration T during which the pressure-decreasing mode operation is established with a second set time duration T2 of 10 ms, for example. If the time T is not greater than the second set time T2, which means the pressure-decreasing mode operation has been established by a large hydraulic pressure variation before the hydraulic braking pressure reaches the wheel-locked pressure value, a duty-cycle pressure-increase execution counter clear flag FDC indicating how many times intermittent pressure increases are established in the previous duty-cycle pressure-increasing mode operation is reset to 0 in step 212. Then, a duty-cycle pressure-increasing pointer value calculation termination flag FSDC is reset to 0 in step 213, and the control returns to the main routine shown in FIG. 3.

If the time duration T is found to be greater than the second set time duration T2 in step 203, the duty-cycle pressure-increase execution counter clear flag FDC is reset to 1 in step 204, and then step 205 is executed for judging whether or not the time duration T is greater than a first set time duration T1 of 20 ms, for example. If the result is no, the control returns to the main routine shown in FIG. 3. If the result in step 205 is yes, thereby indicating that the pressure-decreasing mode operation is established due to a small variation of the hydraulic pressure though the hydraulic braking pressure approaches the wheel-locked pressure value, step 206 is executed for judging whether or not the duty-cycle pressure-increase execution counter clear flag FSDC is 0. If the result is no, the control returns to the main routine shown in FIG. 3.

If the duty-cycle pressure-increase execution counter clear flag FSDC is found to be 0 in step 206, the control proceeds to step 207 for judging whether or not the current pointer value calculation is the first one. If the result is yes, the duty-cycle pressure-increasing pointer value PD(n) is given an initial value in step 208. In step 209, the duty-cycle pressure-increase execution counter clear flag FSDC is set to be 1, a duty-cycle pressure-increasing pointer increment counter DPOC2 is reset to 0, and the control goes to the main routine shown in FIG. 3.

In step 207, if the current pointer value calculation is found not to be the first one, step 214 is executed for judging whether or not the duty-cycle pressure-increasing pointer increment counter DPOC2 is greater than 0. If the result is yes, step 215 is executed for calculating a correction value ΔPDN on the basis of the pointer value increment. If the result in step 214 is no, step 219 is executed for calculating the correction value ΔPDN on the basis of how many times intermittent pressure increases were repeated in the latest duty-cycle pressure increasing mode operation. After execution of either step 215 or step 219, step 216 is executed for replacing the duty-cycle pressure-increasing pointer value PD(n) with a value obtained by subtracting the correction value ΔPDN from the previous duty-cycle pressure-increasing pointer value PD(n−1). In step 217, the newly calculated duty-cycle pressure-increasing pointer value PD(n) in step 216 is compared to the maximum value. If the former is greater than the latter, the duty-cycle pressure-increasing pointer value PD(n) is replaced with the maximum value in step 218. Then, after execution of steps 209 and 210, the control returns to the main routine shown in FIG. 3. If the result in step 217 is no, indicating that PD(n) is not greater than the maximum value, after executions of steps 209 and 210, the control returns to the main routine shown in FIG. 3.

FIG. 5 shows the detailed processing operations of step 114 in FIG. 3 when the set control mode of the front-rear wheel (front-left wheel) in step 107 is the duty-cycle pressure-increasing mode. First, in step 301 it is determined whether or not the feeding of the control signal to the solenoid valve is the first time. If the result is no, the control goes to step 304. If the result is yes, step 302 is executed for judging whether or not FDC is 1. If the result is no, the control goes to step 304. If the result is yes, step 303 is executed for resetting a counter DPOC1 to 0 which indicates the repetitive number of intermittent pressure increases in the previous duty-cycle pressure-increasing mode operation.

Subsequently, the control goes to step 304 where the pointer value PD(n) set in the previous pressure-decreasing mode is stored in the memory MPO for increment calculation. Then, in step 305, 1 is added to the counter DPOC1. Next, in step 306, it is determined whether or not the counter DPOC1 is less than or equal to (i.e., not greater than) 3. If the result is yes, the control goes to step 307. If the result in step 306 is no, it is determined in step 312 whether or not the counter DPOC1 is less than or equal to (i.e., not greater than) 7. If the result is yes, 1 is added to the pointer value PD(n) in step 313 for updating the same. If the result is no, in step 312 it is then determined in step 314 whether or not the counter DPOC1 is less than or equal to (i.e., not greater than) 11. If the result is yes, 2 is added to the counter DPOC1 in step 315 for updating the same. If the result in step 314 is no, 3 is added to DPOC1 in step 316 for updating DPOC1.

Thus, the pointer value PD(n) remains unchanged until it is established that the fourth feeding of the control signal to the solenoid valve has occurred. When it is determined that the control signal fed to the solenoid valve is the 4th, 5th, 6th or 7th control signal, 1 is added to the pointer value PD(n). When it is determined that the control signal fed to the solenoid valve is the 8th, 9th, 10th or 11th control signal, 2 is added to the pointer value PD(n). Every time when it is established that the feeding of the control signal to the solenoid vale is the 12th time or greater, 3 is added to the pointer value PD(n).

In step 307, it is judged whether or not the pointer value PD(n) is greater than the maximum value. If the result is no, the control goes to step 309. If the result is yes, the pointer value PD(n) is replaced with the maximum value in step 308. Then, in step 309, the counter DPOC2 is added with a value obtained by subtracting the contents of MPO from the pointer value PD(n). In step 310, the previous pointer value PD(n−1) is replaced with the current value PD(n). In step 311, on the basis of the duty rate depending on the current pointer value PD(n), the feeding of the control signal to the solenoid valve is established. Thereafter, the control goes to the main routine shown in FIG. 3.

It can be seen therefore, that the operation of the system proceeds as follows. In the first pressure decrease mode, when the conditions in step 105 of FIG. 3 are met, the control flag is set to "1" and the system goes to the duty cycle setting subroutine in FIG. 4. When the system executes the anti-skid control, it begins with a pressure decrease mode. Thus, in FIG. 4, before T exceeds T2 the system proceeds through steps 201, 202, 203, 212, 213 and then returns, after T>T2 the system proceeds through steps 201, 202, 203, 204, 205 and then returns, and after T>T1 the system proceeds through 201, 202, 203, 204, 205, 206, 207, 208, 209, 210 and then returns. The first pressure decrease is always longer than the set times T1 and T2 so that the system sets the initial value for PD(n) in step 208 for the first pressure increase mode following the first pressure decrease mode.

When the system executes the first duty cycle pressure increase mode after the first pressure decrease mode, the system sends out the valve control signals in accordance with the subroutine shown in FIG. 5. The system finishes the first duty cycle pressure increase mode and then goes into the second pressure decrease mode. In the second pressure increase mode, the system determines the pointer value (duty ratio of the duty cycle pressure increase mode) in accordance with the subroutine depicted in FIG. 4 depending on the time which the second pressure decrease mode has operated (i.e., depending upon the relationship of T with respect to T1 and T2).

In the situation where T≦T2 (the pressure decrease mode is completed before the time T exceeds T2), the system goes through steps 201, 202, 203, 212, 213, and then returns. The system sets FDC=0 in step 212 and FSDC=0 in step 213. The system proceeds through steps 301, 304, 305 . . . Thus the system begins duty cycle pressure increase mode with same data kept in the system for the previous repetition counter and the previous pointer value PD(n). This situation may occur when a large hydraulic pressure vibration occurs before the hydraulic pressure reaches the wheel locking pressure. The first pressure increase mode is terminated incompletely and therefore an extremely early second pressure decrease mode is operated. Since the brake pressure did not reach the maximum pressure which may cause a wheel lock, the duty ratio of the second pressure increase mode may be too small, thereby resulting in a slow pressure increase.

In the situation where T2<T≦T1, the system proceeds through steps 203, 204, 205 and then returns. The system also proceeds through steps 301, 302, 303, 304, 305 . . . The system sets FDC=1 to clear the repetition counter. Thus, the system begins the duty cycle pressure increase mode with a cleared repetition counter and the same pointer value kept in the system in the previous increase mode. This situation indicates that the first pressure increase mode is considered to be completed expectedly so the system continues the second pressure increase mode with the same pointer value.

Finally, in the situation where T>T2 and T>T1, the system proceeds through steps 203, 204, 205, 206, 207, 214 . . . In step 207, the system goes to 214 because the pointer value calculation is not the first time (it's done during the first pressure decrease mode). In step 214, the system goes to either step 215 or step 219 based on the repetition number in the first pressure increase mode. In the first pressure increase mode, the system would increase the pointer value PD(n) based on the repetition number in step 306 in FIG. 5. If the repetition number is less than or equal to 3, the system does not increase the pointer value. In step 309, DPOC2 remains 0 because PD(n) would be the same as MPO. Therefore, if the previous repetition number is greater than 3 (DPOC2 is greater than 0), the system goes to step 215. If the previous repetition number is less than or equal to 3 (DPOC2 is less than or equal to 0), the system goes to step 219. Thus, the system begins the duty cycle pressure increase mode with a cleared repetition counter and the pointer value adjusted with either the incremented pointer value or the repetition number in the previous pressure increase mode. This situation indicates that the second pressure decrease mode was operated slightly earlier than expected. This may occur if a small hydraulic pressure vibration occurs when the hydraulic brake pressure reaches near or approaches the wheel locking pressure.

The benefits and advantages attributable to the present invention are summarized in the table set forth below.

| CONDITION | OUTLINE OF THE ANTI-SKID CONTROL OPERATION |
|---|---|
| T ≦ T2 | The controller deems that a pressure-decreasing mode operation is established by a large hydraulic pressure vibration before hydraulic braking pressure reaches the wheel-locked pressure value, and the first duty cycle and the repetition number are as they are succeeded to the next duty-cycle pressure-increasing mode operation. A considerable easing of the pressure increase graduation is prevented. |
| T > T2 & T > T1 | The first duty cycle of the next duty cycle pressure-increasing mode is adjusted based on the repetitive number of the duty cycle of the previous pressure-increasing mode operation or the increase of the duty-cycle increment pointer of the previous duty-cycle pressure-increasing mode operation. |
| T > T2 & T ≦ T1 | The controller deems that an early pressure-decreasing mode operation is established due to a small hydraulic pressure vibration though the hydraulic braking pressure has reached the wheel-locked pressure value, and the next duty-cycle pressure-increasing mode operation is initiated without adjusting the first duty-cycle. A slight easing of the pressure increase graduation is prevented. |

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An anti-skid control system for an automotive vehicle comprising:

a hydraulic pressure source;

a wheel brake connected to the hydraulic pressure source for braking a wheel;

a pressure control valve interposed between the hydraulic pressure source and the wheel brake to regulate hydraulic braking pressure supplied from the hydraulic pressure source to the wheel brake, the pressure control valve being operable under a duty-cycle pressure-increasing mode operation and a pressure-decreasing mode operation for respectively increasing and decreasing the hydraulic braking pressure;

a speed sensor for detecting a speed of the wheel; and an electric control device for controlling the pressure control valve on the basis of signals from the speed sensor to alternatively establish the duty-cycle pressure-increasing mode operation and the pressure-decreasing mode operation, the electric control device controlling the pressure control valve such that when a time duration between the previous and later duty-cycle pressure-increasing mode operations is less than a set value the later duty-cycle pressure-increasing mode operation is treated as a succession of the previous duty-cycle pressure-increasing mode operation.

2. An anti-skid control system as recited in claim 1, including a pair of wheel brakes and a pair of pressure control valves, each pressure control valve being interposed between the hydraulic pressure source and one of the wheel brakes.

3. An anti-skid control system for an automotive vehicle comprising:

a hydraulic pressure source;

a wheel brake connected to the hydraulic pressure source for braking a wheel;

a pressure control valve interposed between the hydraulic pressure source and the wheel brake to regulate hydraulic braking pressure supplied from the hydraulic pressure source to the wheel brake, the pressure control valve being operable under a duty-cycle pressure-increasing mode operation and a pressure-decreasing mode operation for increasing and decreasing the hydraulic braking pressure, respectively;

a speed sensor for detecting a speed of the wheel; and an electric control device for controlling the pressure control valve on the basis of signals from the speed sensor to alternately establish the duty-cycle pressure-increasing mode operation and the pressure-decreasing mode operation for achieving a gradual increase of hydraulic braking pressure to the wheel brake, the electric control device controlling the pressure control valve so that: (a) a later duty-cycle pressure-increasing mode operation is treated as a succession of a previous pressure-increasing mode operation when a time duration between the previous and later duty-cycle pressure-increasing mode operations is less than a set value; (b) the later duty-cycle pressure-increasing mode operation is initiated without adjusting a first duty cycle thereof if said time duration between the previous and later duty-cycle pressure-increasing mode operations is not less than the set value and said time duration is not greater than another set value which is greater than the set value; and (c) the later duty-cycle pressure-decreasing mode operation is initiated by adjusting the first duty cycle thereof on the basis of a repetitive number of intermittent pressure increases in the previous duty-cycle pressure-increasing mode operation if said time duration between the previous and later duty-cycle pressure-increasing mode operations is greater than said another value.

4. An anti-skid control system as recited in claim 3, including a pair of wheel brakes and a pair of pressure control valves, each pressure control valve being interposed between the hydraulic pressure source and one of the wheel brakes.

5. An anti-skid control system for an automotive vehicle comprising:

a hydraulic pressure source;

a wheel brake connected to the hydraulic pressure source for braking a wheel;

a pressure control valve interposed between the hydraulic pressure source and the wheel brake to regulate a hydraulic braking pressure supplied from the hydraulic pressure source to the wheel brake, the pressure control valve being operable under a duty-cycle pressure-increasing mode operation and a pressure-decreasing mode operation for respectively increasing and decreasing the hydraulic braking pressure;

a speed sensor for detecting a speed of the wheel;

an electric control device for controlling the pressure control valve on the basis of signals from the speed sensor to alternately establish the duty-cycle pressure-increasing mode operation and the pressure-decreasing mode operation for gradually increasing the hydraulic braking pressure in the wheel brake;

means for measuring a time duration required for the pressure-decreasing mode operation between two duty-cycle pressure-increasing mode operations;

means for treating the later duty-cycle pressure-increasing mode operation as a succession of the previous duty-cycle pressure-increasing mode operation if the time duration is less than a set value;

means for establishing the later duty-cycle pressure-increasing mode operation if the time duration is not less than the set value and is not greater than another value which is greater than the set value; and means for establishing the later duty-cycle pressure-increasing mode operation such that a first duty cycle is adjusted on the basis of a repetition number of the duty cycle in the previous duty-cycle pressure-increasing mode operation if the time duration is greater than said another value.

6. An anti-skid control system as recited in claim 5, including a pair of wheel brakes and a pair of pressure control valves, each pressure control valve being interposed between the hydraulic pressure source and one of the wheel brakes.

* * * * *